United States Patent
Stark et al.

(10) Patent No.: US 9,394,396 B2
(45) Date of Patent: Jul. 19, 2016

(54) HYDROGEN SULFIDE SCAVENGER FOR USE IN HYDROCARBONS

(75) Inventors: Joseph L. Stark, Richmond, TX (US); Robert A. Steele, Pinole, CA (US); Ksenija Babić-Samardžija, Katy, TX (US); John A. Schield, Missouri City, TX (US); Weldon J. Cappel, Tomball, TX (US); Matthew T. Barnes, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 762 days.

(21) Appl. No.: 13/527,105

(22) Filed: Jun. 19, 2012

(65) Prior Publication Data

US 2012/0329930 A1      Dec. 27, 2012

Related U.S. Application Data

(60) Provisional application No. 61/499,513, filed on Jun. 21, 2011.

(51) Int. Cl.

| | |
|---|---|
| *C07C 205/06* | (2006.01) |
| *C10L 1/22* | (2006.01) |
| *C10G 29/20* | (2006.01) |
| *C08G 12/06* | (2006.01) |

(52) U.S. Cl.
CPC ............. *C08G 12/06* (2013.01); *C10G 29/20* (2013.01); *C09K 2208/20* (2013.01); *C10G 2300/1025* (2013.01); *C10G 2300/1033* (2013.01); *C10G 2300/207* (2013.01)

(58) Field of Classification Search
CPC .......... C07C 205/06; C10L 1/22; C10G 29/20
See application file for complete search history.

(56) References Cited

U.S. PATENT DOCUMENTS

| | | | | |
|---|---|---|---|---|
| 2,345,237 | A | * | 3/1944 | Chitwood et al. ............ 544/350 |
| 4,220,550 | A | | 9/1980 | Frenier et al. |
| 5,169,411 | A | * | 12/1992 | Weers .............................. 44/421 |
| 5,266,185 | A | * | 11/1993 | Weers ....................... C09K 8/54 208/14 |
| 5,354,453 | A | * | 10/1994 | Bhatia ........................... 208/236 |
| 5,417,845 | A | * | 5/1995 | Mabire et al. ............. 208/208 R |
| 5,554,349 | A | | 9/1996 | Rivers et al. |
| 5,698,171 | A | * | 12/1997 | Trauffer et al. ............... 423/220 |
| 5,744,024 | A | * | 4/1998 | Sullivan et al. ............... 208/236 |
| 6,024,866 | A | | 2/2000 | Weers et al. |
| 7,255,796 | B2 | | 8/2007 | Chen et al. |
| 7,264,786 | B2 | | 9/2007 | Pakulski et al. |
| 2009/0065445 | A1 | | 3/2009 | Westlund et al. |
| 2013/0004393 | A1 | | 1/2013 | Menendez et al. |

FOREIGN PATENT DOCUMENTS

EP      0938363   B1      5/2003

\* cited by examiner

*Primary Examiner* — Randy Boyer
(74) *Attorney, Agent, or Firm* — Mossman, Kumar & Tyler, P.C.

(57) ABSTRACT

An effective hydrogen sulfide scavenger that produces little corrosion may be prepared by reacting glyoxal with a compound having at least two primary or secondary amine groups. The subject hydrogen sulfide scavengers may be used with both the production of crude oil and natural gas, and the refining of same.

17 Claims, No Drawings

HYDROGEN SULFIDE SCAVENGER FOR USE IN HYDROCARBONS

CROSS REFERENCE TO RELATED APPLICATIONS

This application claims priority from the U.S. Provisional Patent Application serial number 61/499,513 which was filed on June 21, 2011.

BACKGROUND OF THE INVENTION

1. Field of the Invention

The invention relates to additives useful for reducing the concentration of hydrogen sulfide in hydrocarbons. The invention particularly relates to additives that are a system of components and their use in hydrocarbons to scavenge hydrogen sulfide.

2. Background of the Art

Hydrocarbons, such as crude oil, may contain acids in several forms. These acids may be mineral acids such as hydrochloric and phosphoric acids. A common inorganic acid found in hydrocarbons is hydrogen sulfide and various oxidized forms of hydrogen sulfide such as sulfuric acid.

Hydrogen sulfide is both toxic and corrosive. Neither of these properties is usually desirable in hydrocarbons.

Hydrogen sulfide may be present when crude oil is produced from an oil well. It may also be present or created by decomposition of other sulfur containing compounds during a refining process. If not removed, generally by scavenging, it may still be present after refining in hydrocarbon products ranging from light lubricating oils to fuels to heavy fuels to bitumen. It would therefor be desirable in the art of producing and refining hydrocarbons to reduce or remove hydrogen sulfide from the hydrocarbons.

SUMMARY OF THE INVENTION

In one aspect, the invention may be a hydrogen sulfide scavenger including a reaction product of glyoxal and a polyamine. The hydrogen sulfide scavenger may also include a dispersant.

In another aspect, the invention may be the product of treating a hydrocarbon with a hydrogen sulfide scavenger wherein the hydrogen sulfide scavenger includes a reaction product of glyoxal and a polyamine.

In still another aspect, the invention may be a method of treating a hydrocarbon with a hydrogen sulfide scavenger wherein the hydrogen sulfide scavenger includes a reaction product of glyoxal and a polyamine. The method may also include using a dispersant as a component of the hydrogen sulfide scavenger.

DESCRIPTION OF THE PREFERRED EMBODIMENTS

In one embodiment of the disclosure, a hydrogen sulfide scavenger may be a system of components including the reaction product of glyoxal and a polyamine. Glyoxal has the structure:

For the purposes of this application, the term polyamine shall mean a compound having 2 or more primary or secondary amine groups or at least one primary and one secondary amine group. These compounds shall include at least 2 carbons and may have as many as 12 carbons. In some embodiments, the polyamine may have from about 2 to about 10 carbons. In still other embodiments, the polyamine may have from about 2 to about 6 carbons.

The polyamines may be linear, branched, or cycloaliphatic. Exemplary polyamines useful with the method of the disclosure include ethylene diamine (EDA), diethylene triamine (DETA), triethylene tetramine (TETA), tetraethylene pentamine (TEPA), piperazine, cyclohexane diamine, butane diamine, and combinations thereof.

In one embodiment of the method of the disclosure, a reaction product of glyoxal and a polyamine is employed as a component of a hydrogen sulfide scavenger. The subject reaction product is a product prepared by a process including introducing the glyoxal with the polyamine under reaction conditions to induce an exothermic reaction. Any method known to be useful to those of ordinary skill in the art to be useful may be employed to produce the reaction product. For example, if not spontaneous, then the reaction may be catalyzed using an acid such as HCl.

The equivalent ratio of glyoxal to polyamine, in some embodiments of the method of the disclosure, may be from about 1:9 to about 9:1. In other embodiments the equivalent ratio of the glyoxal to the polyamine may be from about 1:7 to about 7:1. In still other embodiments, the equivalent ratio of the glyoxal to the polyamine may be from about 1:4 to about 2:1. In yet other embodiments, the equivalent ratio of the glyoxal to the polyamine may be about 1:1.

While not wishing to be bound under any theory, it is believed that the at least some of the glyoxal and polyamines react to form crosslinked copolymers having imine and di-imine moieties which interact with hydrogen sulfide to produce the scavenging effect observed with the claimed compositions and method.

In some embodiments of the method of the disclosure, the reaction product may not be as compatible as desired in a hydrocarbon being treated and thus a dispersant may be employed. The dispersant used may be cationic, anionic or non-ionic. Exemplary dispersants include, but are not limited to mono-ethylene glycol n-hexyl ether (Hexyl Cellosolve[R] available from Union Carbide); ethylene glycol monobutyl ether (Butyl Cellosolve[R]); di- and tri-propylene glycol derivatives of propyl and butyl alcohol, which are available from Arco Chemical (3801 West Chester Pike, Newtown Square, Pa. 19073) and Dow Chemical (1691 N. Swede Road, Midland, Mich.) under the trade names Arcosolv[R] and Dowanol[R]; mono-propylene glycol mono-propyl ether; di-propylene glycol mono-propyl ether; mono-propylene glycol mono-butyl ether, di-propylene glycol mono-propyl ether, di-propylene glycol mono-butyl ether; tri-propylene glycol mono-butyl ether; ethylene glycol mono-butyl ether; di-ethylene glycol mono-butyl ether, ethylene glycol mono-hexyl ether; di-ethylene glycol mono-hexyl ether; 3-methoxy-3-methyl-butanol; and mixtures thereof.

Polymeric dispersants may also be used. For example, ethoxylated long chain and/or branched alcohols, ethoxylated carboxylic acids, and ethoxylated nonylphenols having from about 2 to about 11 ethylene oxide (EO) units, ethoxylated long chain and branched alcohols, ethoxylated carboxylic acids, and ethoxylated esters of glycerol may be useful with some embodiments of the methods of the disclosure. Any dispersant that is useful for dispersing water soluble compounds into the hydrocarbon to be treated and that does not interact adversely with the surfactant and/or the hydrocarbon or any downstream processes that may be in the offing for the hydrocarbon, that is known to those of ordinary skill in the art, may be used.

In some embodiments of the claimed method, the hydrogen sulfide scavenger system may consist essentially of only the glyoxal and polyamine reaction product. For the purposes of this application, the terms "consisting essentially of" means that the hydrogen sulfide scavenger has no more than 5 percent by weight or, in some embodiments, no more than 1 percent by weight of any other nitrogen containing components. In still other embodiments, the hydrogen sulfide scavenger is prepared without a dispersant.

The hydrogens sulfide scavenger claimed herein are useful in treating hydrocarbons. The hydrocarbons may be crude, partially refined, or fully refined and pending commercial consumption. When the hydrocarbons to be treated are crude hydrocarbons, in one embodiment they may be very "crude" and be, for example, crude oil. In another embodiment, the crude hydrocarbon may only be "crude" in regard to a subsequent refining step. For example, in one embodiment, the method of the disclosure may be a refining step to produce light hydrocarbon fuels such as gasoline or aviation fuel. In refineries, the feed streams for such units have already undergone at least one step to remove components that are not desirable for producing such fuels. Thus, in this embodiment, the feed stream to this unit is a crude hydrocarbon even though it has had at least one refining process step already performed upon it.

In at least one embodiment of the method of the disclosure, the hydrocarbon being treated with a hydrogen sulfide scavenger is asphalt. For the purposes of this application, the term "asphalt" refers to any of a variety of materials that are solid or semisolid at room temperature and which gradually liquefy when heated, and in which the predominant constituents are naturally occurring bitumens (or kerogens) or which are bitumen like materials obtained as residue in petroleum refining.

The total feed rate of the hydrogen sulfide scavenger will generally be determined by the operator of the specific production process unit to be subjected to treatment using the claimed hydrogen sulfide scavengers. Those of ordinary skill in the art in operating such a unit will know how to make such determinations based upon the specific operating parameters of their production units. Nevertheless, in some embodiments, the feed rate of the hydrogen sulfide scavengers will be from about 10 to 10,000 ppm in the process stream being treated. In other embodiments, the feed rate will be from about 100 to 1,000 ppm. In still other embodiments, the feed range will be from about 200 to about 800 ppm. Often this rate is based upon a ratio of the scavenger to the hydrogens sulfide present. Such ratios are often based upon weight and can range, in some embodiments of the method of the disclosure, from (scavenger: hydrogen sulfide) about 1:200 to about 200:1.

The hydrogen sulfide scavengers of the application may be introduced into their target feed material in any way known to be useful to those of ordinary skill in the art subject to the caveat that the hydrogen sulfide scavengers are introduced prior to or concurrent with the a refining process. For example, in one application, the hydrogen sulfide scavenger is injected into the feed material upstream from a refining unit as the feed material passes through a turbulent section of piping. In another application, the hydrogen sulfide scavenger is admixed with the feed material in a holding vessel that is agitated. In still another application, the hydrogen sulfide scavenger is admixed with the feed immediately upstream of a refining unit by injecting the hydrogen sulfide scavenger into a turbulent flow, the turbulent flow being created by static mixers put into place for the purpose of admixing the hydrogen sulfide scavenger with a feed material. In still another embodiment, the hydrogen sulfide scavenger is atomized and fed into a vaporous feed stream using, for example, an injection quill.

When used outside of a refining process, the hydrogen sulfide scavengers may be introduced in any way useful for the target application. For example, when the application to be treated is an oil well, the scavenger may be introduced downhole or into the above ground equipment as are other, conventional scavengers. The claimed scavengers may also be introduced into pipelines, storage vessels and even into mobile storage vessels such as trucks, rail cars, and ship holds. Is some embodiments, scavengers are actively mixed and in others passively mixed with the hydrocarbons being treated.

EXAMPLES

The following examples are provided to illustrate the invention. The examples are not intended to limit the scope of the invention and they should not be so interpreted. Amounts are in weight parts or weight percentages unless otherwise indicated.

Example 1

Condensate, a liquid under ambient conditions which is a mixture of low molecular weight alkanes, is sparged with nitrogen having a hydrogen sulfide concentration of 1% for 1 hour.

The concentration of the hydrogen sulfide in the condensate prior to treatment (blank) is determined to be 19.9 ppm. The condensate is then tested by introducing a hydrogen sulfide scavenger prepared by reacting glyoxal and DETA at a molar ratio of 1:1 (which is an equivalent ratio of 1:2). The treated condensate and a blank were shaken using an orbital shaker at 400 rpm at ambient conditions for 4 hours. The blank was retested and had a hydrogens sulfide concentration of 10.5 ppm. The treated sample showed no measurable hydrogen sulfide (<0.5 ppm).

Example 2

Example 1 was repeated substantially identically except that the initial concentration of hydrogen sulfide was 30.8 ppm and the hydrogen sulfide scavenger was introduced at a concentration of 300 ppm. After treatment, the blank has a hydrogen sulfide concentration of 13.1 ppm. The treated sample showed no measurable hydrogen sulfide (<0.5 ppm).

Example 3

The hydrogen scavenger of Example 1 is used to immerse carbon steel corrosion coupons. The immersed coupons were held at about 40° C. for 14 days. The corrosion rate was determined to be about 19.19 mpy.

Discussion of Examples

The examples show that the claimed hydrogen sulfide scavengers are effective at reducing the concentration of hydrogen sulfide in hydrocarbons. They also show that the claimed hydrogen sulfide scavengers have a very low corrosion rate.

What is claimed is:

1. A hydrogen sulfide scavenger comprising a reaction product of glyoxal and a polyamine selected from the group consisting of triethylene tetramine (TETA), tetraethylene pentamine (TEPA), cyclohexane diamine, butane diamine, and combinations thereof.

2. The hydrogen sulfide scavenger of claim 1 wherein the polyamine has from about 2 to about 10 carbons.

3. The hydrogen sulfide scavenger of claim 2 wherein the polyamine has from about 2 to about 6 carbons.

4. The hydrogen sulfide scavenger of claim 1 wherein the equivalent ratio of glyoxal to polyamine is from about 1:9 to about 9:1.

5. The hydrogen sulfide scavenger of claim 4 wherein the equivalent ratio of glyoxal to polyamine is from about 1:7 to about 7:1.

6. The hydrogen sulfide scavenger of claim 5 wherein the equivalent ratio of glyoxal to polyamine is from about 1:4 to about 2:1.

7. The hydrogen sulfide scavenger of claim 1 wherein the equivalent ratio of glyoxal to polyamine is about 1:1.

8. The hydrogen sulfide scavenger of claim 1 wherein the hydrogen sulfide scavenger additionally comprises a dispersant.

9. The hydrogen sulfide scavenger of claim 8 wherein the dispersant is selected from the group consisting of mono-ethylene glycol n-hexyl ether (Hexyl Cellosolve[R] available from Union Carbide); ethylene glycol monobutyl ether (Butyl Cellosolve[R]); di- and tri-propylene glycol derivatives of propyl and butyl alcohol, which are available from Arco Chemical (3801 West Chester Pike, Newtown Square, Pa. 19073) and Dow Chemical (1691 N. Swede Road, Midland, Mich.) under the trade names Arcosolv[R] and Dowanol[R]; mono-propylene glycol mono-propyl ether; di-propylene glycol mono-propyl ether; mono-propylene glycol mono-butyl ether, di-propylene glycol mono-propyl ether, di-propylene glycol mono-butyl ether; tri-propylene glycol mono-butyl ether; ethylene glycol mono-butyl ether; di-ethylene glycol mono-butyl ether, ethylene glycol mono-hexyl ether; di-ethylene glycol mono-hexyl ether; 3-methoxy-3-methyl-butanol; and mixtures thereof.

10. The hydrogen sulfide scavenger of claim 8 wherein the dispersant is selected from the group consisting of ethoxylated long chain and/or branched alcohols, ethoxylated carboxylic acids, and ethoxylated nonylphenols having from about 2 to about 11 ethylene oxide (EO) units, ethoxylated long chain and branched alcohols, ethoxylated carboxylic acids, ethoxylated esters of glycerol, and combinations thereof.

11. The hydrogen sulfide scavenger of claim 8 wherein the dispersant is present at a concentration of less than about 5%.

12. The hydrogen sulfide scavenger of claim 8 wherein the dispersant is present at a concentration of less than about 1%.

13. A composition comprising the product resulting from treating a hydrocarbon with a hydrogen sulfide scavenger of claim 1 where the composition further comprises the hydrogen sulfide scavenger.

14. The composition of claim 13 wherein the hydrocarbon is crude oil.

15. The composition of claim 13 wherein the hydrocarbon is asphalt.

16. A method of treating a hydrocarbon with a hydrogen sulfide scavenger comprising introducing a hydrogen sulfide scavenger into a hydrocarbon at a location selected from the group consisting of a feed material upstream from a refining unit as the feed material passes through a turbulent section of piping, in a holding vessel that is agitated, into a turbulent flow immediately upstream of a refinery unit, into a vaporous stream, and combinations thereof; wherein the hydrogen sulfide scavenger comprises a reaction product of glyoxal and a polyamine selected from the group consisting of triethylene tetramine (TETA), tetraethylene pentamine (TEPA), cyclohexane diamine, butane diamine, and combinations thereof.

17. The method of claim 16 wherein the hydrogen sulfide scavenger is introduced into the hydrocarbon at a concentration of from about 10 to about 10,000 ppm.

* * * * *